March 14, 1944.  H. RUSKIN  2,343,932
STAPLE MAGAZINE AND FEED MEANS FOR STAPLING MACHINES
Filed Jan. 15, 1940   4 Sheets-Sheet 1
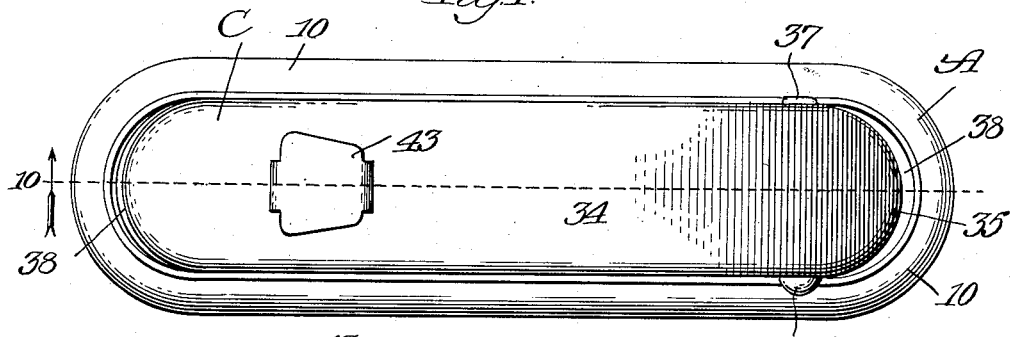
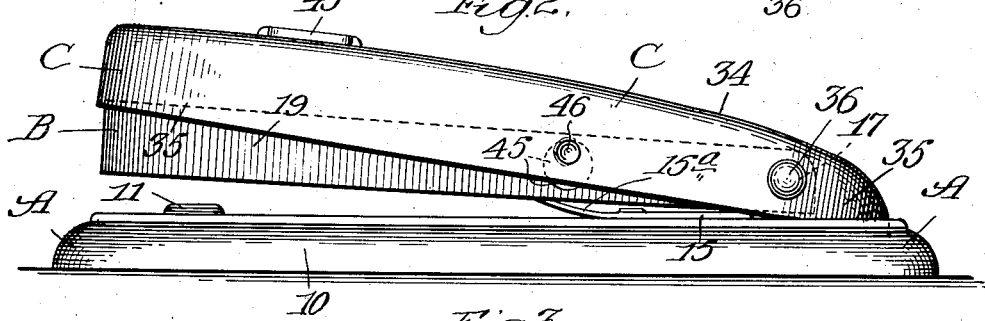
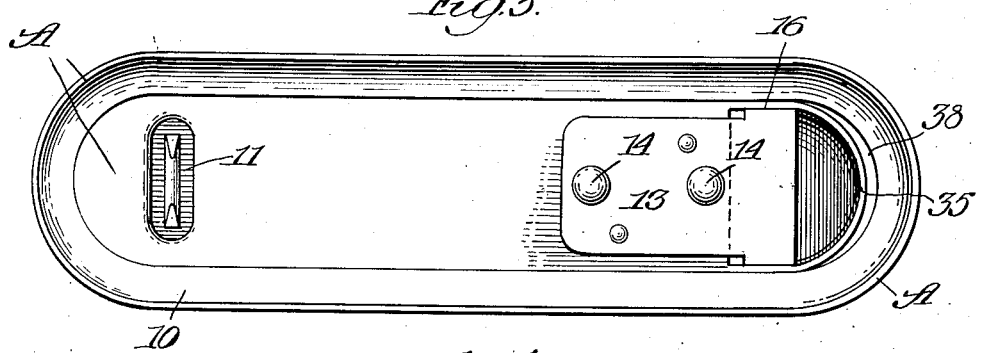
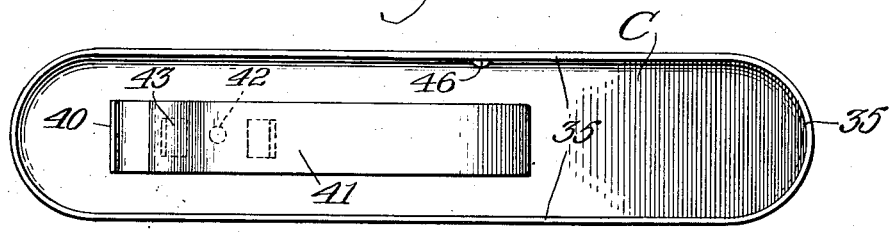
Inventor:
Henry Ruskin,
By Britton, Wiles, Davies, Hirsch & Dawson,
Attys.

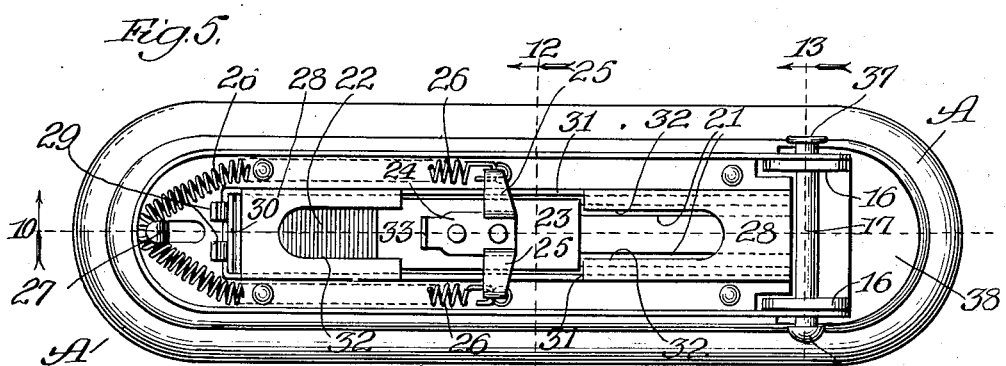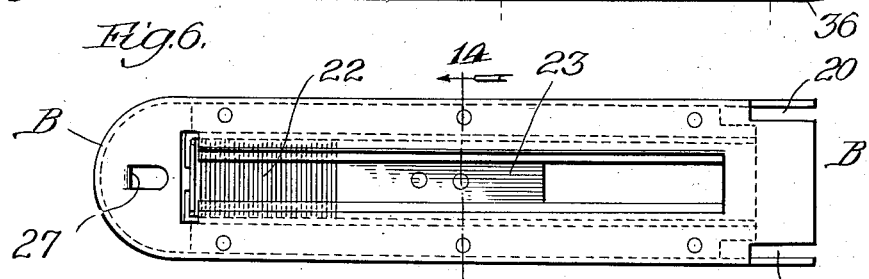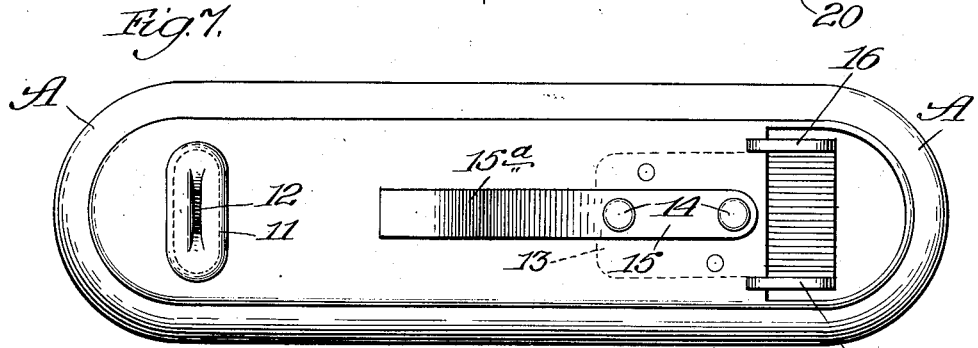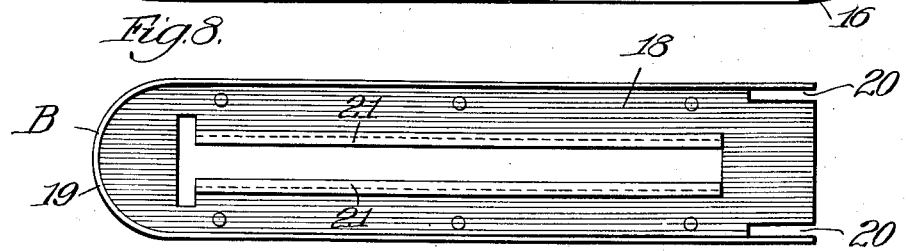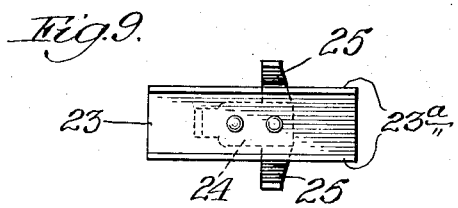

March 14, 1944.  H. RUSKIN  2,343,932
STAPLE MAGAZINE AND FEED MEANS FOR STAPLING MACHINES
Filed Jan. 15, 1940    4 Sheets-Sheet 3
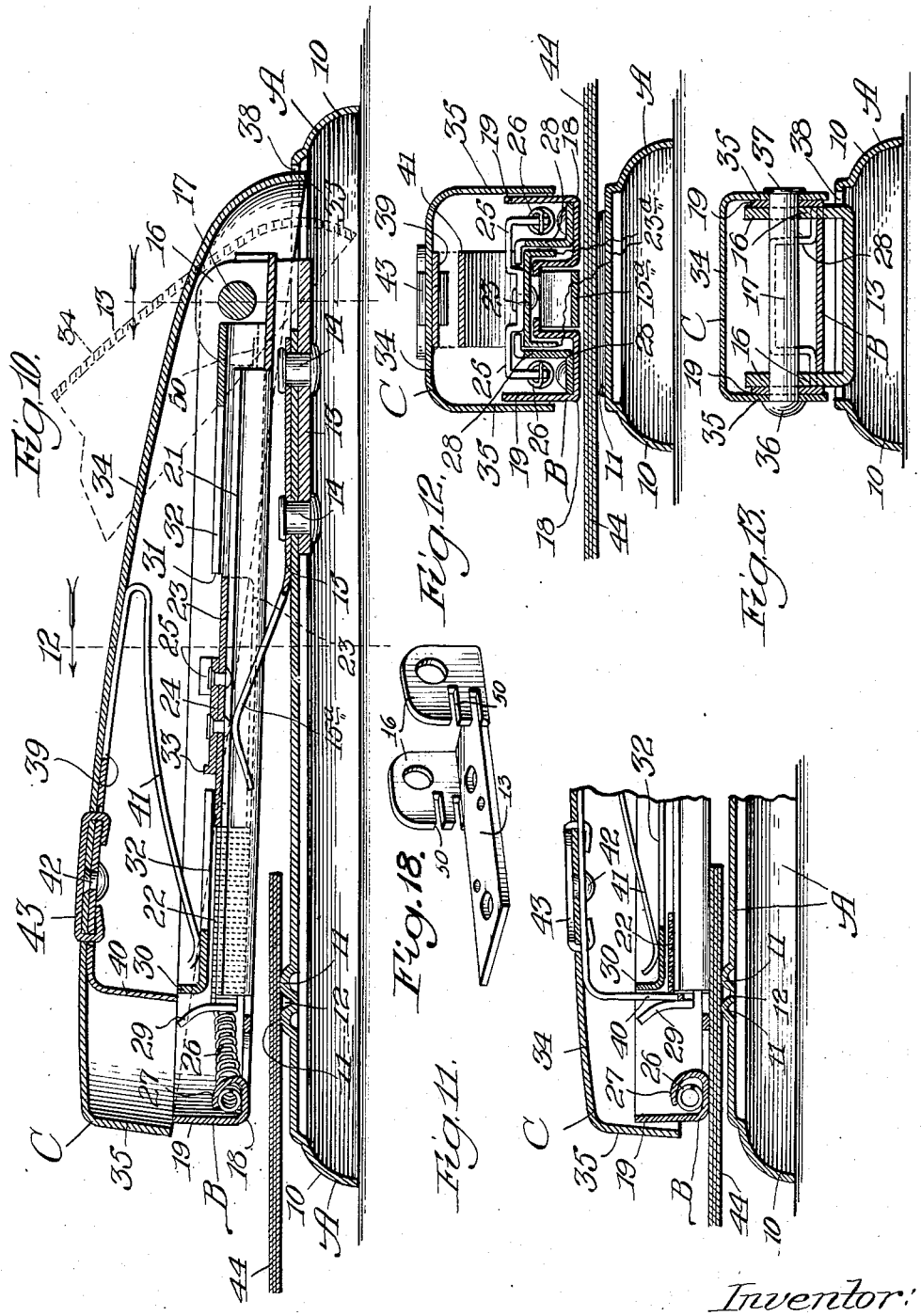
Inventor:
Henry Ruskin
By Chritton, Wiles, Davies, Hirsch & Dawson,
Attys March 14, 1944. H. RUSKIN 2,343,932
STAPLE MAGAZINE AND FEED MEANS FOR STAPLING MACHINES
Filed Jan. 15, 1940 4 Sheets-Sheet 4

Inventor:
Henry Ruskin,
By Critton, Wiles, Davies, Hirschl & Dawson,
Att'ys

Patented Mar. 14, 1944

2,343,932

UNITED STATES PATENT OFFICE 2,343,932

STAPLE MAGAZINE AND FEED MEANS FOR STAPLING MACHINES

Henry Ruskin, Chicago, Ill., assignor to Metal Specialties Manufacturing Co., Chicago, Ill., a corporation of Illinois Application January 15, 1940, Serial No. 313,966

5 Claims. (Cl. 1—3)

This invention relates to a stapler. It is useful for passing staples through paper, tags, and other materials and clenching the staples. Other uses will be apparent.

An object of the invention is to provide a stapler of simple and compact construction, which will readily and accurately feed staples into clenching position. A further object is to provide a stapler structure which may be formed of light metal but which provides sturdy and efficient stapling mechanism. Other specific objects and advantages will appear as the specification proceeds.

The invention is illustrated, in a preferred embodiment, by the accompanying drawings, in which—

Figure 14:
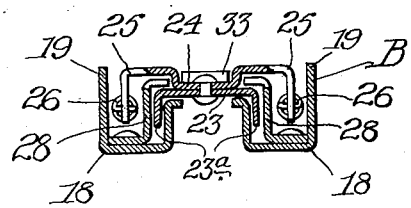
Figure 15:
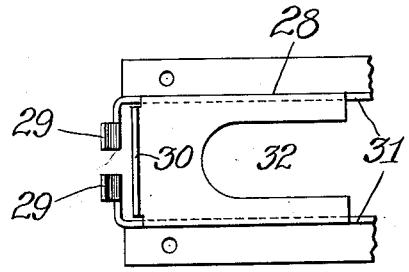
Figure 16:
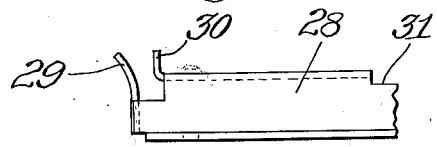
Figure 17:
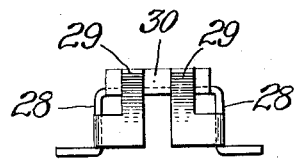

Figure 1 is a top plan view of apparatus embodying my invention; Fig. 2, a side elevational view; Fig. 3, a bottom plan view of the base member; Fig. 4, a bottom plan view of the top portion of the device; Fig. 5, a top plan view of the device with the upper cover member removed; Fig. 6, a bottom view of the intermediate section removed; Fig. 7, a plan view of the base member with remaining portions removed; Fig. 8, a plan view of the housing for the magazine; Fig. 9, a bottom view of the follower member; Fig. 10, an enlarged longitudinal sectional view, the section being taken as indicated at line 10 of Figs. 1 and 5; Fig. 11, a broken sectional view similar to Fig. 10 but showing the driver in a position about to drive a staple; Fig. 12, a transverse sectional view, the section being taken as indicated at line 12 of Fig. 10; Fig. 13, a detail transverse sectional view, the section being taken as indicated at line 13 of Fig. 10; Fig. 14 is a transverse sectional view taken along the line 14 of Fig. 6; Fig. 15 is a detail plan view of a portion of the staple guide in the magazine; Fig. 16 is a fragmentary side elevational view of the same; and Fig. 17 is a front elevational view of the guide; and Fig. 18 is a detail perspective view of the bracket which supports the magazine and cover of the stapler embodying the invention, the bracket being equipped with a notch providing a stop for the movement of the magazine.

In the illustration given, A designates a base member; B, an intermediate or magazine member; and C, a cover or driver casing.

The base A is provided with downwardly turned flanges 10 forming a base. At its forward end, it is provided with an upwardly embossed portion 11 provided with a central anvil portion 12 having cam sides causing the staples to turn inwardly into clenched position. To reinforce the rear portion of the base 10 and to provide a secure anchor for the hinged portions, which will be later described, I provide a heavy metal plate 13 which is riveted to the top wall of the base A. The rivets 14 also secure a spring member 15 having an upwardly extending spring finger 15ª. The reinforcing plate 13 is provided with upwardly extending flanges 16 which are perforated to receive the cross shaft 17. The sturdy flanges or supports 16 thus provide a pivot support for the pivotally-mounted upper members of the apparatus.

The intermediate casing or magazine support B comprises a metal housing strip 18 having upwardly turned edge flanges 19 and having a portion of its bottom wall cut away at 20, as shown more clearly in Fig. 8, to receive the plate support flanges 16. The central portion of the housing 18 is struck upwardly to form vertical side flanges 21 providing a track for staples, which are indicated by the numeral 22. Mounted upon the flanges or track 21 is a follower member 23 having downwardly turned side flanges 23ª and equipped at its top with a plate 24 having laterally extending arms 25. To the ends of the arms 25 are secured the ends of a single spring 26. The spring extends about an upwardly struck abutment 27 formed from the member 18 and located at the forward end of the member 18. With this arrangement, the follower 23 is drawn forwardly so as to feed the staples 22 in a forward direction.

The outer casing for the follower 23 is provided by a member 28 which is riveted to the member 18, as shown more clearly in Figs. 12 and 14. The forward end of the member extends upwardly and forwardly to provide a bifurcated driver guide 29. Also, the forward end of the member 28 is turned upwardly at 30, as shown more clearly in Figs. 10 and 11, and it provides a stop bridging the two sides of the member. It will be noted that the member 28 is cut away centrally at 31 to enable the staples to be readily inserted upon the track 21 and to provide access to the follower 23, slots 32 extending on either side of the cutaway portion 31. By this means, the follower may be retracted substantially to the rear of the track 21 to permit the insertion of a block of staples through the central open space.

In order to prevent the follower member 23 from passing below the driver, the forward end of the plate 23 is extended and provided with a stop member 33 adapted to engage the bridge at the forward end of the member 28.

It will be noted as seen particularly in Fig. 14 that the bracket arms or plate extensions 16 have notched portions 50 extending over the member 18 which permit a limited upward swing of the plate. This prevents the magazine housing 18 from swinging too far upwardly and providing a space in which the fingers of the operator may be caught.

The cover member C may be of any suitable construction. In the illustration given, it consists of a top web 34 equipped with downwardly turned edge portions 35. The side edge portions are perforated to receive the pivot shaft 17. The shaft 17 is provided on one side with a head 36 and on the other side with a rivet head 37. By this means, the pivotally mounted members B and C are securely carried upon the bracket arms 16.

The cover member C has its casing extending rearwardly of the pivot 17 and the extension is adapted to pass through an opening 38 in the top wall of the base A. The opening 38 in the base permits the cover C to be opened relatively wide to permit direct access to the magazine casing B, as for the insertion or removal of staples 22.

On its inner side, the cover member C is provided with a spring member 39, the forward end of the spring member being turned downwardly and inclined slightly forwardly to form a spring driver 40. The rear portion of the member 39 is turned downwardly to form a spring finger 41. The spring member 39 is secured to the top wall 34 of the member C by the rivet 42 and also by a plate member 43 which has end portions extending downwardly through openings in the wall 34 and spring member 39 and then bent inwardly into clenched position. The plate 43 is adapted to bear insignia of any desired character. In the illustrations given in Figs. 10, 11 and 12, several sheets of paper are indicated by the numeral 44.

A pin-punch lug 46 on one of the side flanges 35 of the member C (Figs. 2 and 4), is provided to enter the hole 45 (Fig. 2) formed in the adjacent side flange 19 of the member B. The engagement of the lug with the wall of the hole limits the upward movement of the member C under the force of the upward thrust of the spring 41.

*Operation*

In the operation of the device, the cover member C is raised, this movement being permitted by the opening 38 in the base A, which opening receives the rearwardly extending portion of C. The raising of the cover C exposes the interior of the magazine member C, and loading of the magazine may be accomplished by first retracting the follower member 23. The fingers of the operator may draw the follower rearwardly readily by engagement with the upwardly extending finger arms 25. After the follower 23 has been withdrawn to the rear portion of the track 21, a block of staples, cemented together as in the usual manner, may be dropped into the space 31 upon the track 21. The follower may then be released so as to draw, under the influence of spring 26, the block of staples forwardly to the position shown in Fig. 10. The follower 23 may again be withdrawn to its rear position and another block of staples inserted into the space 31, if desired. The tension exerted by the spring 26 causes the follower member 23 to press the staples forwardly so that the foremost staple occupies a position close against the divided driver guide 29. It will be observed that the driver guide at the upper portions 29 is forwardly bent so as to provide a cam surface adapted to be engaged in the descending stroke of the spring driver 40. The spring driver 40 flexes inwardly and in its downward movement follows closely the wall of the guides 29. It thus engages the forward portion of the forward staple without contacting any portion of the next staple. The flexing of the spring member 40 insures accurate engagement with the forward staple. Even though the supporting parts or hinged member should work loose in time, the spring member 40 will be sure to follow the desired path because of the play allowed by the spring and of the flexing of this member after engaging the cam surface of guides 29.

After the magazine has been filled as above described, the cover C is closed to the position shown best in Fig. 10, and paper sheets or other members 44 inserted above the anvil 12. The member B provides a limited area above the anvil for receiving papers to be joined. It is held against vertical movement by engagement with the notched flanges 16, and the spring 15ᵃ normally holds it in raised position. Likewise, spring 41 holds the cover C normally in the partially raised position, illustrated in Fig. 10, with the spring driver 40 just above the guide 29.

In the stapling operation, the cover C is pressed sharply downwardly. In this movement, the driver 40 engages the foremost staple and presses it downwardly. At the same time, the member B moves downwardly against the force of spring finger 15ᵃ to the position shown in Fig. 11. In this position, the staple is driven home, the end portions piercing the paper sheets 44 and being curved inwardly and clamped by the anvil cam portions 12 of base A. Upon release of the cover C, the spring 15ᵃ raises the member B to the position shown in Fig. 10, and spring 41 raises the cover C to the position likewise shown in Fig. 10. At the same time, spring 26 draws the follower 23 forwardly so as to bring the next staple into position against the guides 29. The apparatus is now ready for the next operation.

It will be noted that the staples 22 are exposed from both sides so that they are readily accessible for removal in case one of the staples becomes bent, etc. The magazine or inner stapler case, the follower, and outer stapler guide are all assembled in one unit structure which may be removed as a unit. The base and forming anvil are also formed, as will be noted, in one unit.

While the casing members A, B and C are formed of thin metal, it will be noted that they are reinforced by a heavy metal plate 13, and the overlapping edge portions of the members B and C carried by the pivot pin 17 form a sturdily reinforced structure. The telescoping relation of the members A and B provide accurately guiding structures for each other, both for the front and rear portions thereof.

It will be noted that the follower is drawn by a single spring, the ends of the arms being engaged by the ends of the spring, the tension being thus equalized upon the follower so as to cause it to move uniformly and evenly along the tracks 21.

The spring driver 40 not only enables an arcuate movement of the members C and B to be carried out readily and without interruption, but also insures the accurate engagement with the forward part of the first staple and uniform action even after considerable wear of the pivot parts.

The structure is extremely simple, accurate, and effective in the feeding of staples.

While in the foregoing specification, I have set forth certain details of structure, it will be understood that such details are stated for the purpose of illustration and that changes therein may be made readily by those skilled in the art without departing from the spirit of my invention.

I claim:

1. In stapler apparatus equipped with a base having an anvil thereon, a magazine supported above said base comprising a housing, track means carried by said housing for supporting a plurality of staples, an outer staple guide having a portion extending over said track to maintain said staples upon said track, said outer staple guide being centrally interrupted to provide an opening through which staples may be directly placed upon the track, and means for urging said staples in a forward direction.

2. In stapler apparatus of the class set forth, a magazine comprising a casing equipped with tracks adapted to receive staples, a follower mounted upon said tracks and adapted to urge said staples forwardly, a single spring having its ends secured to said follower, and an anchor carried by said magazine casing and slidably engaging the central portion of said spring adjacent the forward end of the casing.

3. In stapler apparatus of the character set forth, a magazine comprising a housing, a pair of integral flanges extending upwardly from the central portion of said housing to provide spaced apart tracks for carrying staples, an outer staple guide having a portion extending over said tracks to maintain the staples on the tracks, said outer staple guide being centrally interrupted to provide an opening through which staples may be directly placed upon the track, and means for urging the staples toward the forward end of the magazine.

4. In stapler apparatus of the character set forth, a magazine comprising a casing, a pair of integral flanges extending upwardly in spaced parallel relation from the central portion of the housing to provide spaced apart tracks open from the upper and lower sides, said tracks being adapted to carry staples, a follower movably mounted within said casing and adapted to urge said staples forwardly, a single spring having its ends secured to said follower for urging the same forwardly within the casing, and an anchor carried by said casing and slidably engaging the central portion of said spring adjacent the forward end of the casing.

5. In stapler apparatus equipped with a base having an anvil thereon, a magazine supported above said base comprising a housing, track means carried by said housing for supporting a plurality of staples, an outer staple guide having a portion extending over said track to maintain the staples upon said track, said outer staple guide being centrally interrupted to provide an opening through which staples may be placed directly upon the track, a follower mounted upon said track means and adapted to urge said staples forwardly, a single spring having its ends secured to said follower, and an anchor carried by said housing and slidably engaging the central portion of said spring adjacent the forward end of the housing.

HENRY RUSKIN.